United States Patent
Deopura et al.

(10) Patent No.: US 7,377,840 B2
(45) Date of Patent: May 27, 2008

(54) METHODS FOR PRODUCING IN-SITU GROOVES IN CHEMICAL MECHANICAL PLANARIZATION (CMP) PADS, AND NOVEL CMP PAD DESIGNS

(75) Inventors: Manish Deopura, Cambridge, MA (US); Hem M. Vaidya, Sunnyvale, CA (US); Pradip K. Roy, Orlando, FL (US)

(73) Assignee: Neopad Technologies Corporation, Sunnyvale, CA (US)

( * ) Notice: Subject to any disclaimer, the term of this patent is extended or adjusted under 35 U.S.C. 154(b) by 0 days.

(21) Appl. No.: 10/897,192

(22) Filed: Jul. 21, 2004

(65) Prior Publication Data

US 2006/0019587 A1 Jan. 26, 2006

(51) Int. Cl.
*B24D 11/00* (2006.01)
(52) U.S. Cl. .................... 451/527; 451/530
(58) Field of Classification Search ........... 451/527, 451/528, 533, 530, 921, 526
See application file for complete search history.

(56) References Cited

U.S. PATENT DOCUMENTS

| | | | |
|---|---|---|---|
| 5,527,215 A | 6/1996 | Rubino et al. | |
| 5,690,540 A | 11/1997 | Elliott et al. | |
| 5,842,910 A | 12/1998 | Krywanczyk et al. | |
| 5,921,855 A | 7/1999 | Osterheld et al. | |
| 6,120,366 A | 9/2000 | Lin et al. | |
| 6,520,847 B2 * | 2/2003 | Osterheld et al. | 451/527 |
| 6,843,711 B1 * | 1/2005 | Muldowney | 451/527 |
| 6,955,587 B2 * | 10/2005 | Muldowney | 451/41 |
| 6,974,372 B1 * | 12/2005 | Muldowney | 451/527 |
| 7,004,823 B2 * | 2/2006 | Kisboll et al. | 451/57 |
| 7,140,955 B2 * | 11/2006 | Nabeya | 451/287 |

| | | |
|---|---|---|
| 2003/0094721 A1 | 5/2003 | Horie et al. |

(Continued)

FOREIGN PATENT DOCUMENTS

EP 0 674 972 A1 10/1995

(Continued)

OTHER PUBLICATIONS

Doy, T. et al. (2004). "Impact of Novel Pad Groove Designs on Removal Rate and Uniformity of Dielectric and Copper CMP," *Journal of the Electrochemical Society* 151(3):G196-G199.

(Continued)

*Primary Examiner*—Jacob K. Ackun, Jr.
(74) *Attorney, Agent, or Firm*—Morrison & Foerster LLP

(57) ABSTRACT

Methods for producing in-situ grooves in CMP pads are provided. In general, the methods for producing in-situ grooves comprise the steps of patterning a silicone lining, placing the silicone lining in, or on, a mold, adding CMP pad material to the silicone lining, and allowing the CMP pad to solidify. CMP pads comprising novel groove designs are also described. For example, described here are CMP pads comprising concentric circular grooves and axially curved grooves, reverse logarithmic grooves, overlapping circular grooves, lassajous groves, double spiral grooves, and multiply overlapping axially curved grooves. The CMP pads may be made from polyurethane, and the grooves produced therein may be made by a method from the group consisting of silicone lining, laser writing, water jet cutting, 3-D printing, thermoforming, vacuum forming, micro-contact printing, hot stamping, and mixtures thereof.

7 Claims, 11 Drawing Sheets

U.S. PATENT DOCUMENTS

2003/0114084 A1* 6/2003 Moon et al. .................. 451/36

FOREIGN PATENT DOCUMENTS

| | | |
|---|---|---|
| EP | 1 066 928 A2 | 1/2001 |
| EP | 1 066 928 A3 | 1/2001 |
| EP | 1 369 204 A1 | 12/2003 |
| GB | 1 458 729 | 12/1976 |
| JP | 55-90262 A | 7/1980 |
| JP | 2005-74614 A | 3/2005 |

OTHER PUBLICATIONS

International Search Report mailed Feb. 24, 2006 for PCT Application No. PCT/US2005/025330 filed Jul. 15, 2005, seven pages.

* cited by examiner

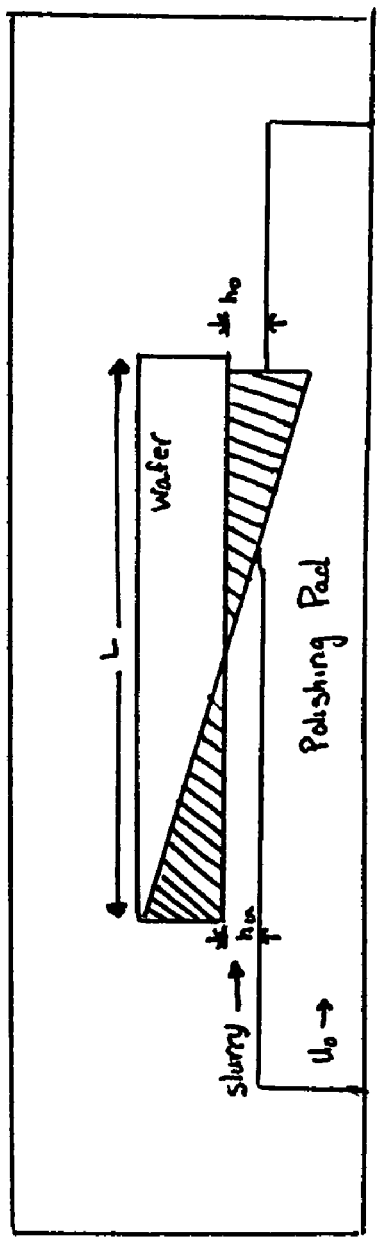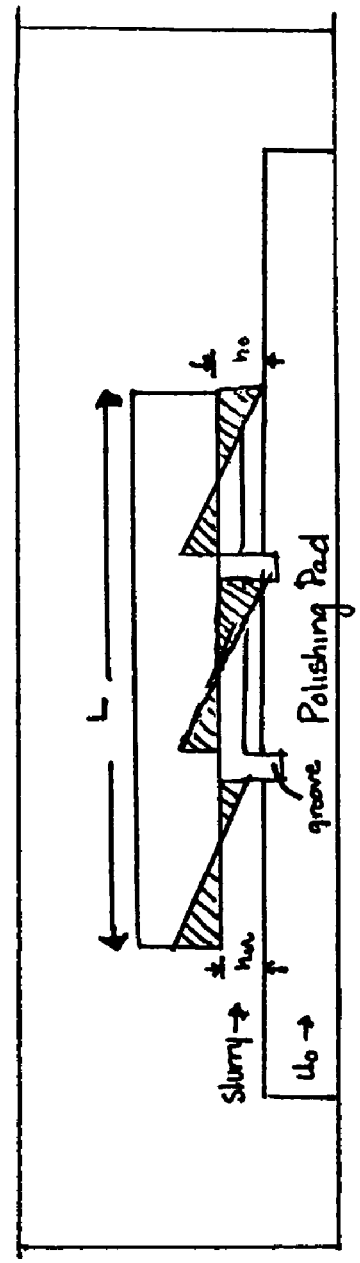
FIG. 1A
FIG. 1B

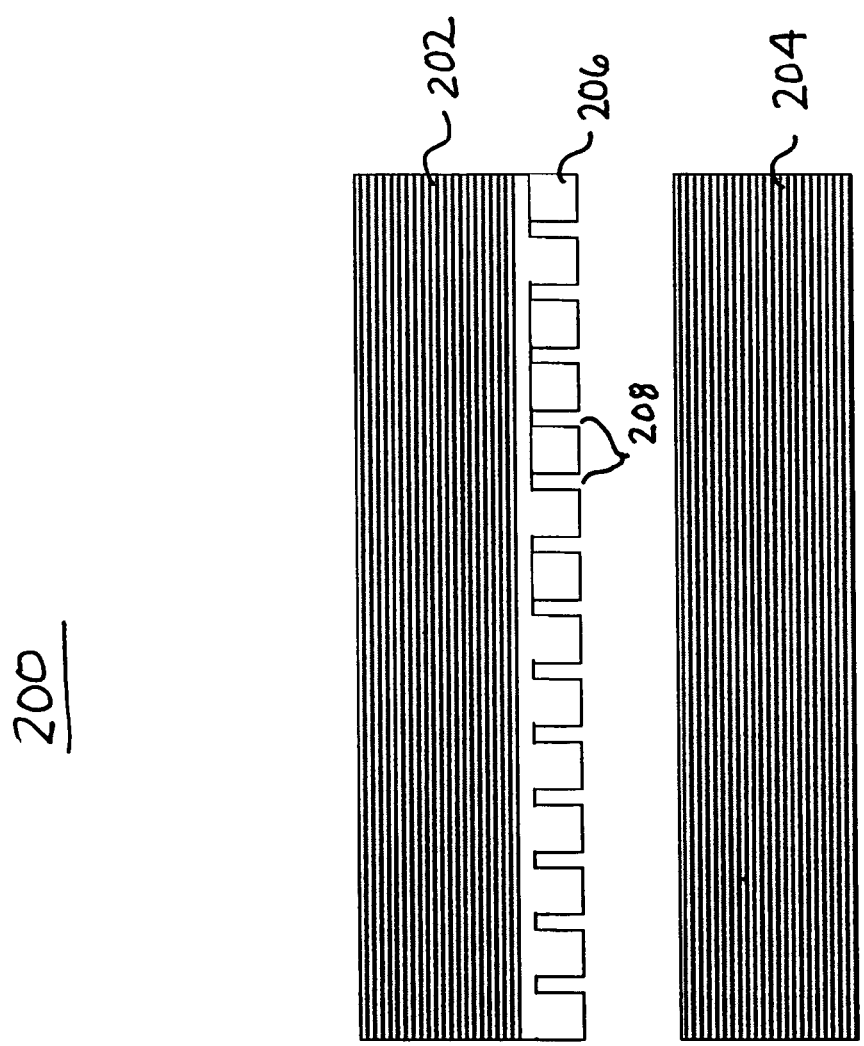

US 7,377,840 B2

METHODS FOR PRODUCING IN-SITU GROOVES IN CHEMICAL MECHANICAL PLANARIZATION (CMP) PADS, AND NOVEL CMP PAD DESIGNS

FIELD

In general, the methods and designs described here are in the field of polishing pads for Chemical Mechanical Planarization (CMP). More particularly, the methods and designs described here are related to in-situ grooves for CMP pads and novel CMP pad designs.

BACKGROUND

In general, CMP is used to planarize individual layers (e.g., dielectric or metal layers) during integrated circuit (IC) fabrication on a semiconductor wafer. CMP removes undesirable topographical features of the IC on the wafer. For example, CMP removes metal deposits subsequent to damascene processes, and excess oxide from shallow trench isolation steps. Similarly, CMP may also be used to planarize inter-metal dielectrics (IMD), or devices with complex architecture, such as system-on-a-chip (SoC) designs and vertical gate structures (e.g., FinFET) with varying pattern density.

CMP utilizes a reactive liquid medium, commonly referred to as a slurry, and a polishing pad to provide chemical and mechanical control to achieve planarity. Either the liquid or the polishing pad may contain nano-size inorganic particles to enhance chemical reactivity and/or mechanical activity of the CMP process. The pad is typically made of a rigid, micro-porous polyurethane material capable of performing several functions including slurry transport, distribution of applied pressure across a wafer, and removal of reacted products. During CMP, the chemical interaction of the slurry forms a chemically modified layer at the polishing surface. Simultaneously, the abrasives in the slurry mechanically interact with the chemically modified layer, resulting in material removal. The material removal rate in a CMP process is related to slurry abrasive concentration and the average coefficient of friction (f) in the pad/slurry/wafer interfacial region. The extent of normal & shear forces during CMP and f typically depends on pad tribology. Recent studies indicate that pad material compliance, pad contact area, and the extent of lubricity of the system play roles during CMP processes. See, e.g, A. Philiposian and S. Olsen, *Jpn. J. Appl. Phys.*, vol. 42, pp 6371-63791; *Chemical-Mechanical Planarization of Semiconductors*, M. R. Oliver (Ed.), Springer Series in Material Science, vol. 69, 2004; and S. Olsen, M.S. Thesis, University of Arizona, Tuscon, Ariz., 2002.

An effective CMP process not only provides a high polishing rate, but also a finished (e.g., lacking small-scale roughness) and flat (e.g., lacking in large-scale topography) substrate surface. The polishing rate, finish, and flatness are thought to be governed by the pad & slurry combination, pad/wafer relative velocity, and the applied normal force pressing the substrate against the pad.

Two commonly occurring CMP non-uniformities are edge effects and center slow effects. Edge effects occur when the substrate edge and substrate center are polished at different rates. Center slow effects occur when there is under-polishing at the center of the substrate. These non-uniform polishing effects reduce overall flatness.

Another commonly observed problem relates to slurry transport and distribution. In the past, polishing pads had perforations. These perforations, when filled, distributed slurry when the pad was compressed. See, e.g., J. Levert et al, *Proc. Of the International Tribology Conf.*, Yokohoma, 1995. This method was ineffective because there was no way to directly channel the excess slurry to where it was most needed (i.e., at the wafer surface). Currently, macro-texturing of pads is typically done through ex-situ pad surface groove design. See, e.g., U.S. Pat. Nos. 5,842,910; 5,921,855; 5,690,540; and T. K. Doy et al, *J. of Electrochem. Soc.*, vol. 151, no. 3, G196-G199, 2004. Such designs include, circular grooves (e.g., concentric grooves referred to as "K-grooves") and cross-hatched patterns (e.g., X-Y, hexagons, triangles, etc.). The groove profile may also be rectangular with 'V-', 'U-' or saw-tooth shaped cross sections.

SUMMARY

Methods for producing in-situ grooves in CMP pads, and novel groove designs are described. In general, the methods for producing in-situ grooves comprise the steps of patterning a silicone lining, placing the silicone lining in, or on, a mold, adding CMP pad material to the silicone lining, and allowing the CMP pad to solidify. In some variations, the silicone lining is made from a silicone elastomer, and in some variations, patterning the silicone lining comprises the step of patterning the silicone lining using lithography or embossing. The methods of producing in-situ grooves may further comprise the step of adhering the silicone lining to the mold, for example, using glue, tape, clamps, pressure fitting techniques, or mixtures thereof.

In some variations, the mold is metallic. For example, the mold may be made from a material selected from the group consisting of aluminum, steel, ultramold material, and mixtures thereof. In some variations, the mold is patterned, in addition to the patterning of the silicone lining (i.e, a combination of patterning is used). In some variations, the CMP pad material comprises a thermoplastic material. In other variations, the CMP pad material comprises a thermoset material. In some variations, the CMP pad material is polyurethane.

CMP pads comprising novel groove designs are also described. For example, described here are CMP pads comprising concentric circular grooves and axially curved grooves. In some variations, the concentric circular grooves are spaced apart in sets. In other variations, the axially curved grooves are overlapping. In yet other variations, the axially curved grooves are discontinuous. The concentric circular grooves and the axially curved grooves may also intersect.

CMP pads comprising reverse logarithmic grooves, overlapping circular grooves, lassajous groves, double spiral grooves, and multiply overlapping axially curved grooves are also described. In some variations, the overlapping circular grooves are off-center. The CMP pads may be made from polyurethane, and the grooves produced therein may be made by a method from the group consisting of silicone lining, laser writing, water jet cutting, 3-D printing, thermoforming, vacuum forming, micro-contact printing, hot stamping, and mixtures thereof.

BRIEF DESCRIPTION OF THE DRAWINGS

FIGS. 1A and 1B provide a schematic of the impact of grooving on the hydrodynamic pressure (P) generated around the pad/wafer region.

FIG. 2 provides a cross-sectional view of how the silicone lining method described here may be used to produce in-situ grooves.

DETAILED DESCRIPTION

Figure 3A:
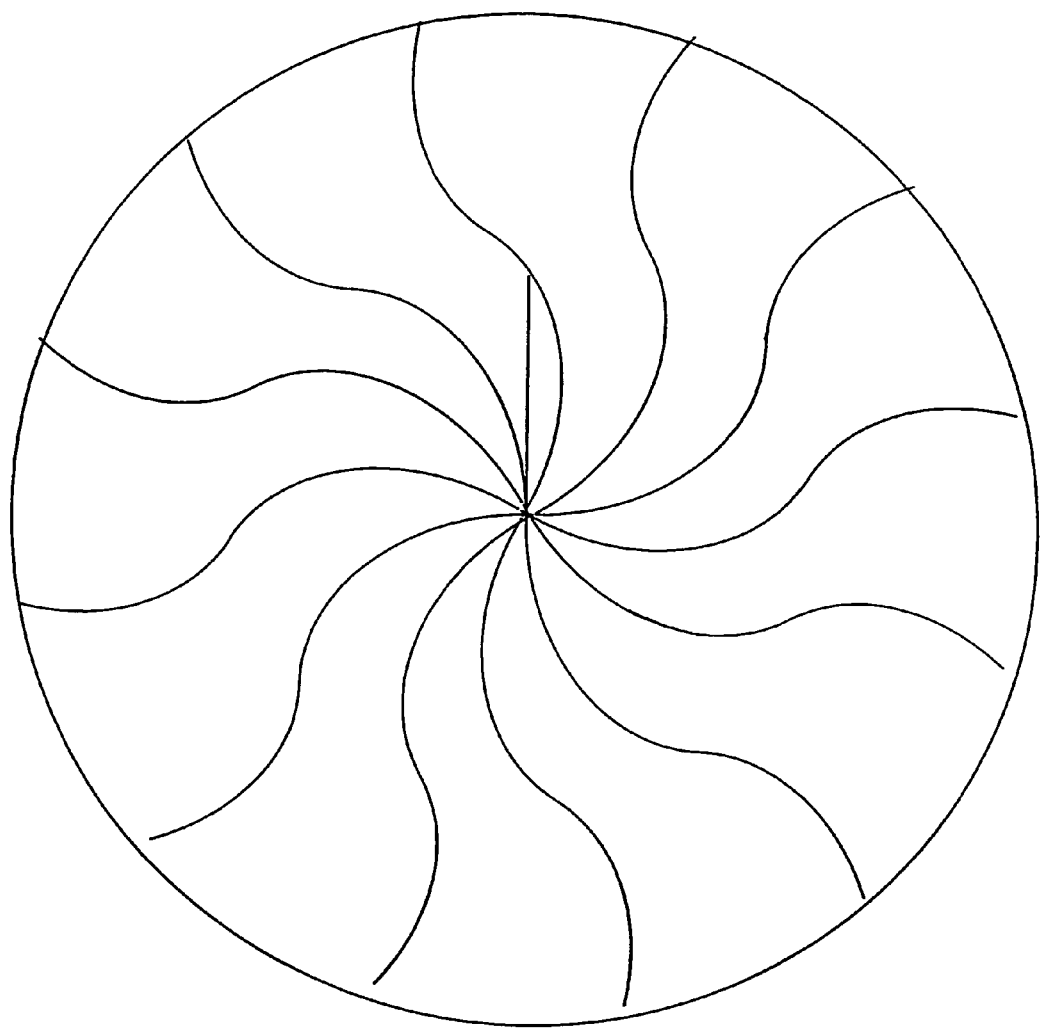
FIGS. 3A-3I provide illustrations of suitable groove designs as described herein.

Described here are methods for in-situ CMP grooving, and novel groove designs. Grooves in CMP pads are thought to prevent hydroplaning of the wafer being polished across the surface of the pad; to help provide distribution of the slurry across the pad surface; to help ensure that sufficient slurry reaches the interior of the wafer; to help control localized stiffness and compliance of the pad in order to control polishing uniformity and minimize edge effects; and to provide channels for the removal of polishing debris from the pad surface in order to reduce defectivity. FIGS. 1A and 1B provide a schematic representation of the impact of grooving on the hydrodynamic pressure generated around the pad/wafer region. For example, FIG. 1A, depicts a wafer pressure profile (indicated by the diagonally striped triangular regions) when a non-grooved polishing pad is used. FIG. 1B illustrates how the pressure around the periphery of the wafer is released along the grooves. That is, the grooves conform to the pressure generated at every groove pitch and, help provide uniform slurry distribution along the wafer/pad region.

Methods for In-Situ Grooving

In general, any suitable method of producing in-situ grooves on a CMP pad may be used. Unlike the current methods of ex-situ grooving, which are mainly mechanical in nature, the in-situ methods described here may have several advantages. For example, the methods of in-situ grooving described here will typically be less expensive, take less time, and require less manufacturing steps. In addition, the methods described here are typically more useful in achieving complex groove designs. Lastly, the in-situ methods described here are typically able to produce CMP pads having better tolerances (e.g., better groove depth, etc.).

In one variation, the methods for in-situ grooving comprise the use of a silicone lining placed inside a mold. The mold may be made of any suitable metal. For example, the mold may be metallic, made from aluminum, steel, ultramold materials (e.g., a metal/metal alloy having "ultra" smooth edges and "ultra" high tolerances for molding finer features), mixtures thereof, and the like. The mold may be any suitable dimension, and the dimension of the mold is typically dependent upon the dimension of the CMP pad to be produced. The pad dimensions, in turn, are typically dependent upon the size of the wafer to be polished. For example, illustrative dimensions for CMP pads for polishing a 4, 6, 8, or 12 inch wafer may be 12, 20.5, 24.6, or 30.5 inches respectively.

The silicone lining is typically made of a silicone elastomer, or a silicone polymer, but any suitable silicone lining may be used. The silicone lining is then typically embossed or etched with a pattern, which is complementary to the desired groove pattern or design. The lining is then glued or otherwise adhered to, or retained in, the mold. It should be noted that the lining may also be placed in the mold prior to it being patterned. The use of lithographic techniques to etch patterns into the silicone lining may help provide better accuracy in groove size. See, e.g., C. Dekker, Steriolithography tooling for silicone molding, *Advanced Materials & Processes*, vol. 161 (1), pp59-61, January 2003; and D. Smock, *Modern Plastics*, vol. 75(4), pp 64-65, April 1998, which pages are hereby incorporated by reference in their entirety. For example, grooves in the micron to sub micron range may be obtained. Large dimensions in the mm range may also be obtained with relative ease. In this way, the silicone lining serves as the "molding pattern." However, in some variations, the mold may be patterned with a complementary groove design. In this way, the mold and the lining, or the mold itself, may be used to produce the CMP pad groove designs.

FIG. 2 provides a cross-sectional view of an illustrative silicone lined mold (200) as described herein. Shown there, is upper mold plate (202), lower mold plate (204) and silicone lining (206). The silicone lining (206) has embossed or etched patterns (208) therein. It should be understood that while the silicone lining (206) is depicted in FIG. 2 along the upper mold plate (202), it need not be. Indeed, the silicone lining (206) may also be adhered to, or otherwise retained in, the lower mold plate (204). The silicone lining may be adhered to, or retained in the mold plate using an suitable method. For example, the silicone lining may be glued, taped, clamped, pressure fit, or otherwise adhered to, or retained in, the mold plate.

Using this method, the CMP pad can be formed from a thermoplastic or a thermoset material, or the like. In the case of a thermoplastic material, a melt is typically formed and injected into the silicone lined mold. In the case of a thermoset material, a reactive mixture is typically fed into the silicone lined mold. The reactive mixture may be added to the mold in one step, or two steps, or more. However, irrespective of the material used, the pad is typically allowed to attain its final shape by letting the pad material cure, cool down, or otherwise set up as a solid, before being taken out of the mold. In one variation, the material is polyurethane, and polyurethane pads are produced. For example, a polyurethane pellet may be melted and placed into the silicone lined mold. The silicone lined mold is etched with the desired pad pattern as described above. The polyurethane is allowed to cool, and is then taken out of the mold. The pad then has patterns corresponding to those of the silicone lined mold.

The potential advantages of producing in-situ grooves using this silicone lining method are several. For example, it may provide for a longer life of the mold because the silicone lining can be replaced easily if it breaks or if there is any wear or tear, and the silicone lining itself typically has a very long lifetime. Similarly, it is easier to remove the pad from the silicone lined mold as compared to a mold where the patterns are engraved therein. Hence, grooves produced using silicone lined molds may be more accurate, and damage to the pads during removal may be minimized. In a like manner, the groove sizes produced using silicone lined molds may be better controlled and better defined. For example, very small dimensions (e.g., lateral and horizontal grooves in the micron to submicron ranges) maybe achieved. Better control and better definition of groove dimensions may be of particular interest in pads for specialized purposes such as low-K dielectrics, Cu removal, STI, SoC, and the like.

Novel Groove Designs

Novel groove designs are also described here. These novel groove designs were largely developed based on flow visualization studies. These studies helped to identify the flow patterns of the slurry on top of the pads. In this way, desirable trajectories of the grooves were calculated. At smaller radius values (i.e., near the inner portion of the pads), grooves were designed with concentric circular grooves to follow the identified flow patterns. At higher radius values (i.e., near the outer portion of the pads), grooves were designed to curtail the flow, e.g., by designing tangential grooves and removing the concentric circular grooves. Typical groove widths range from about 50 to about 500 microns, while typical groove depth ranges from about 100 to about 1000 microns.

Figure 3B:
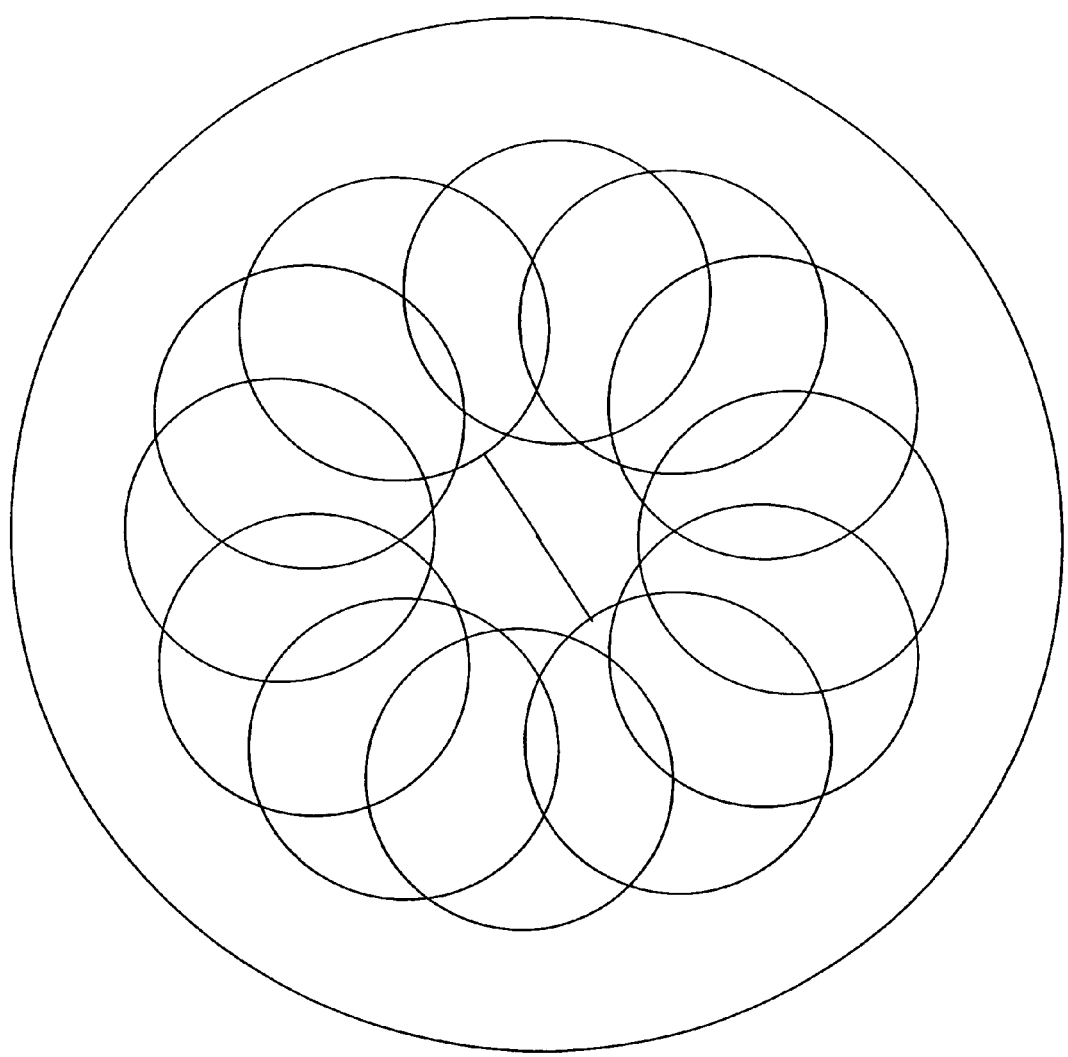
Figure 3C:
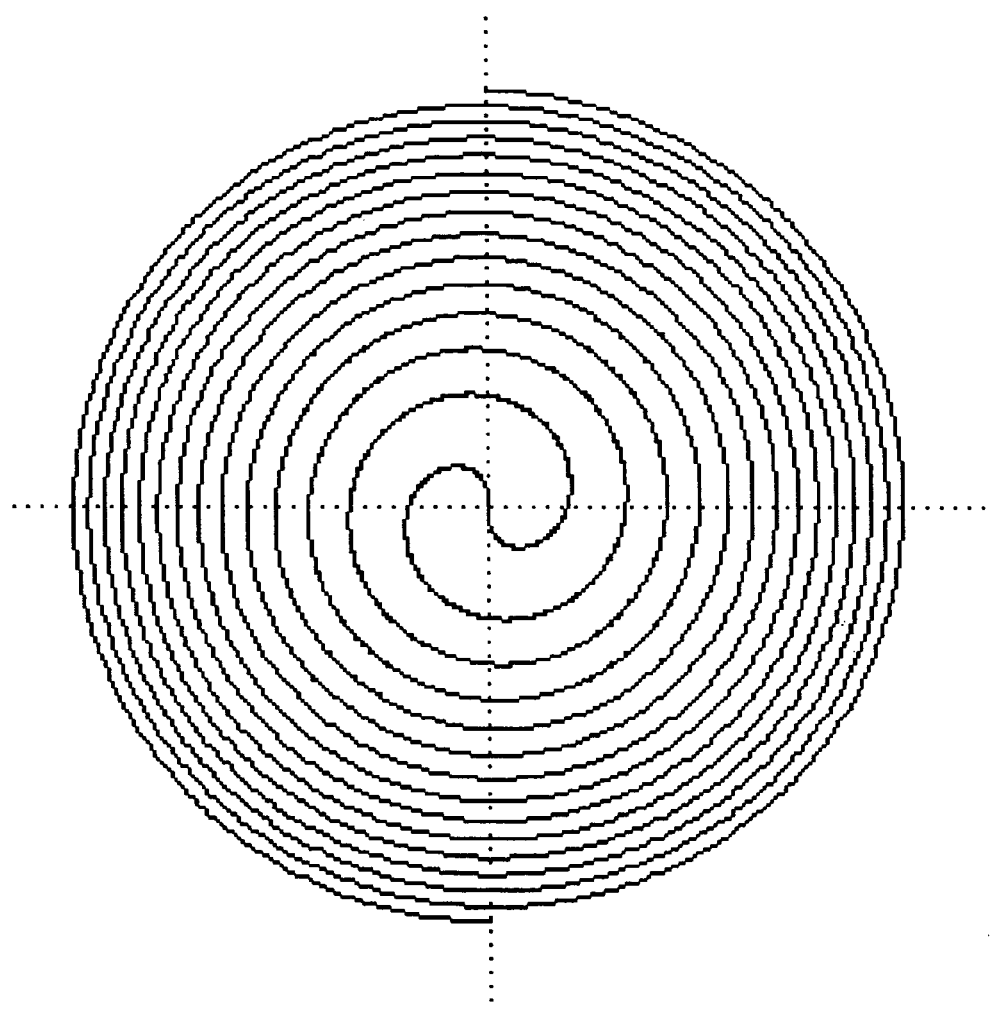
Figure 3D:
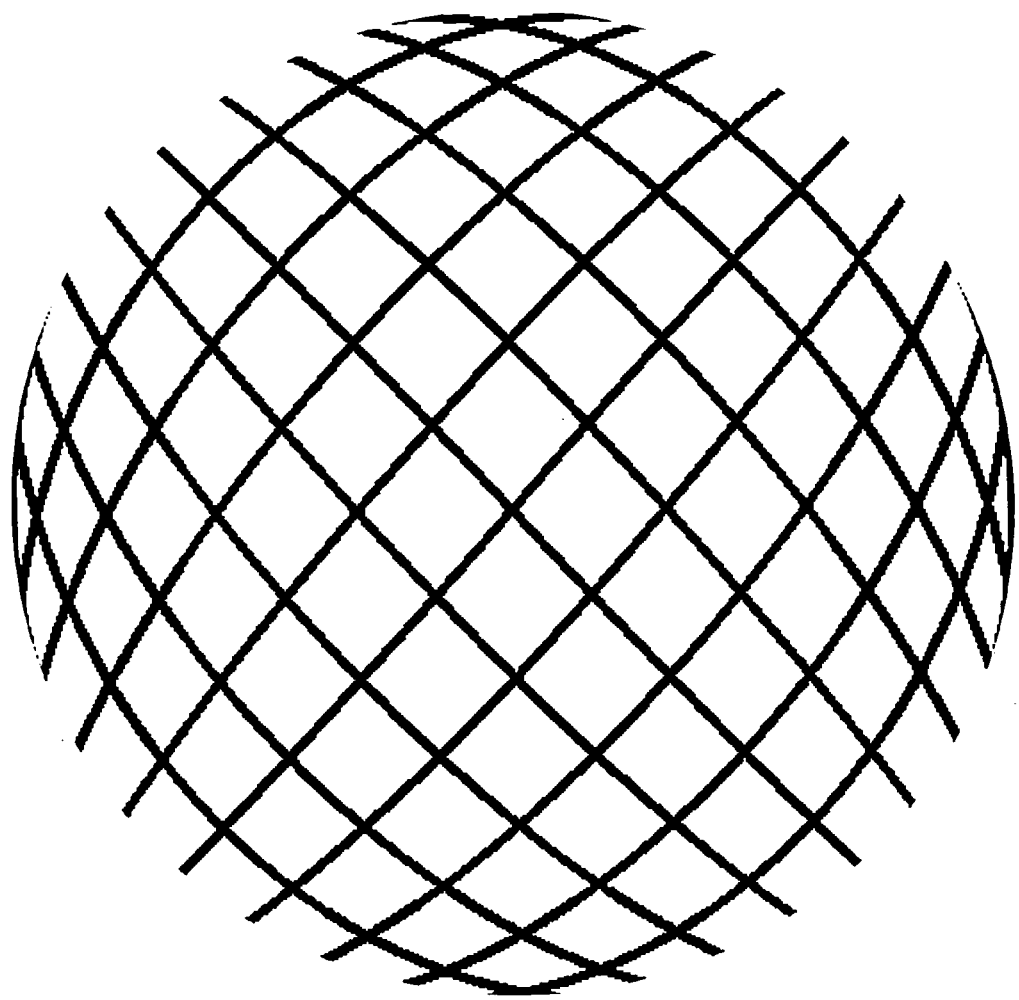
Figure 3E:
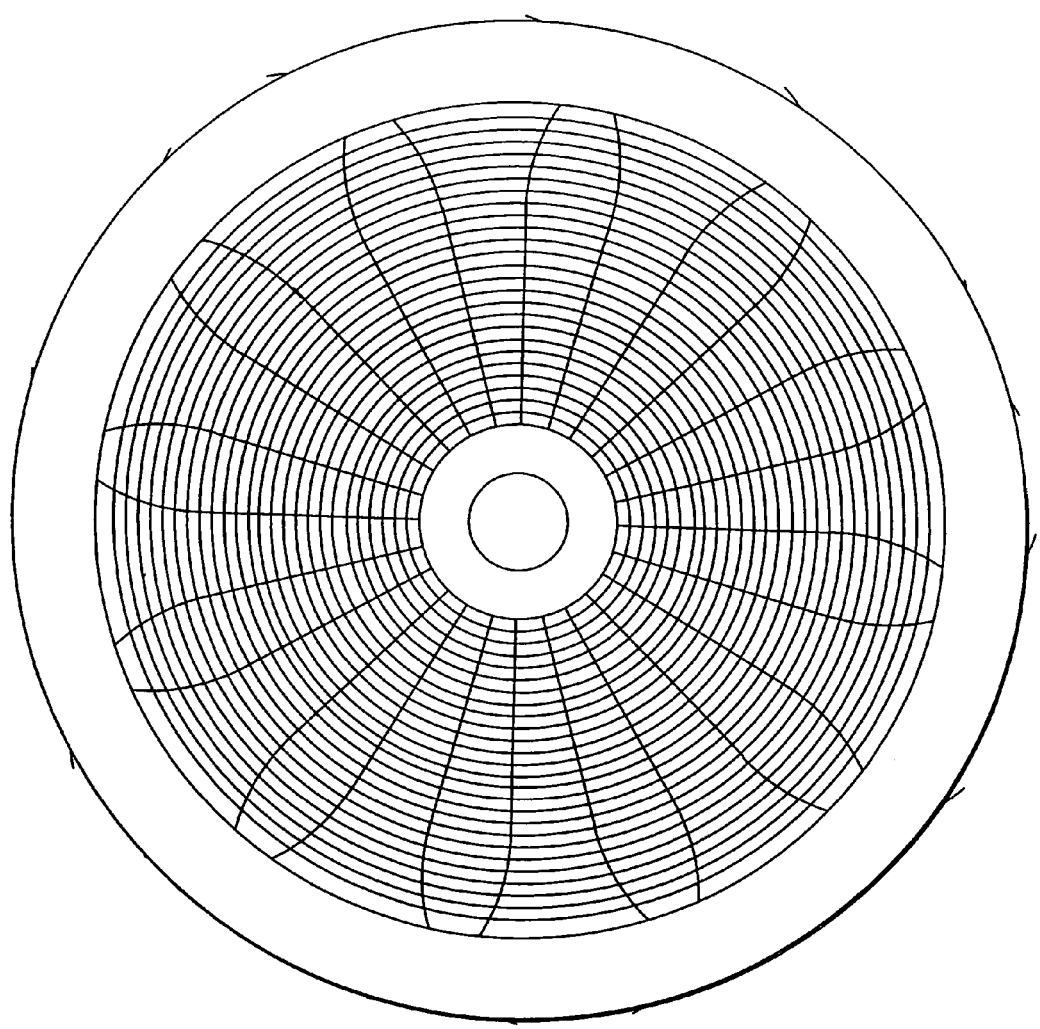
Figure 3F:
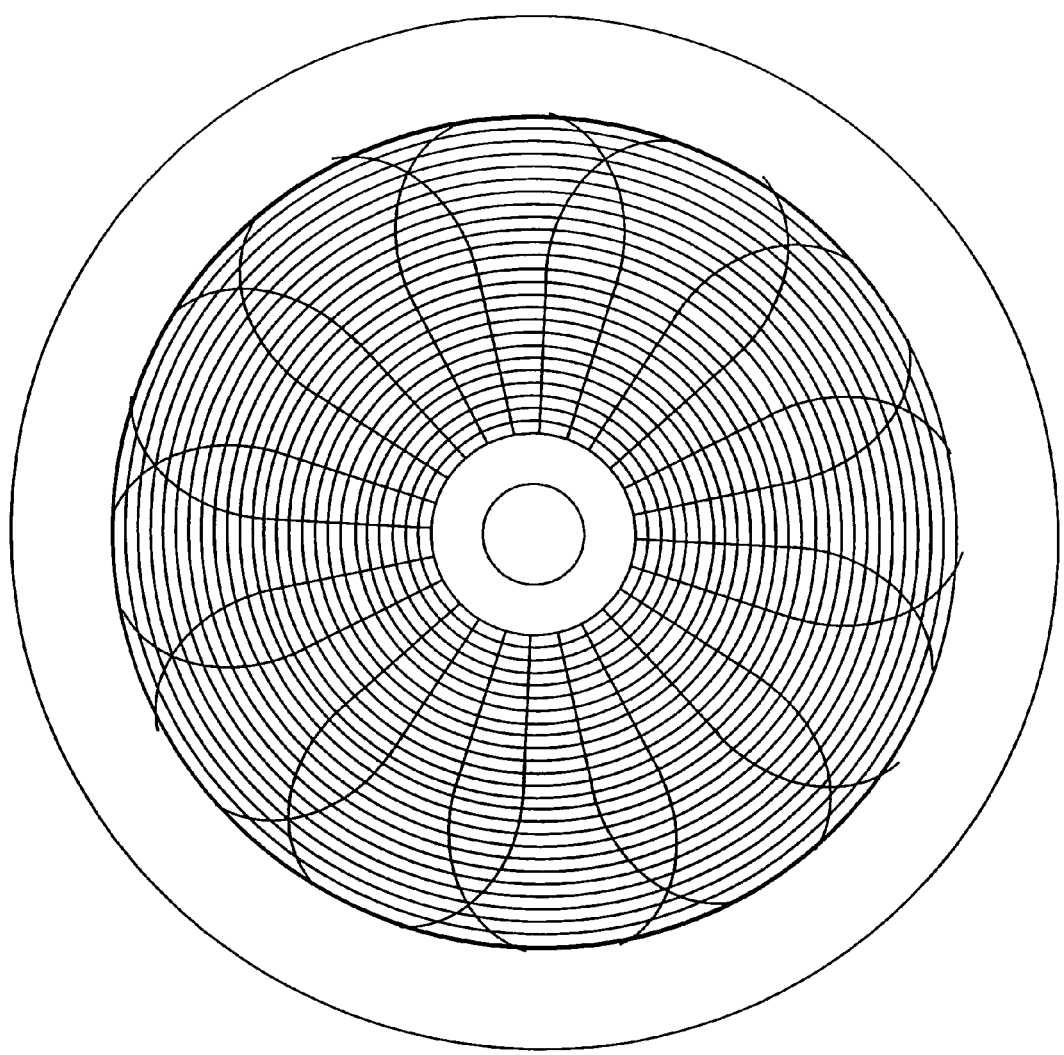
Figure 3G:
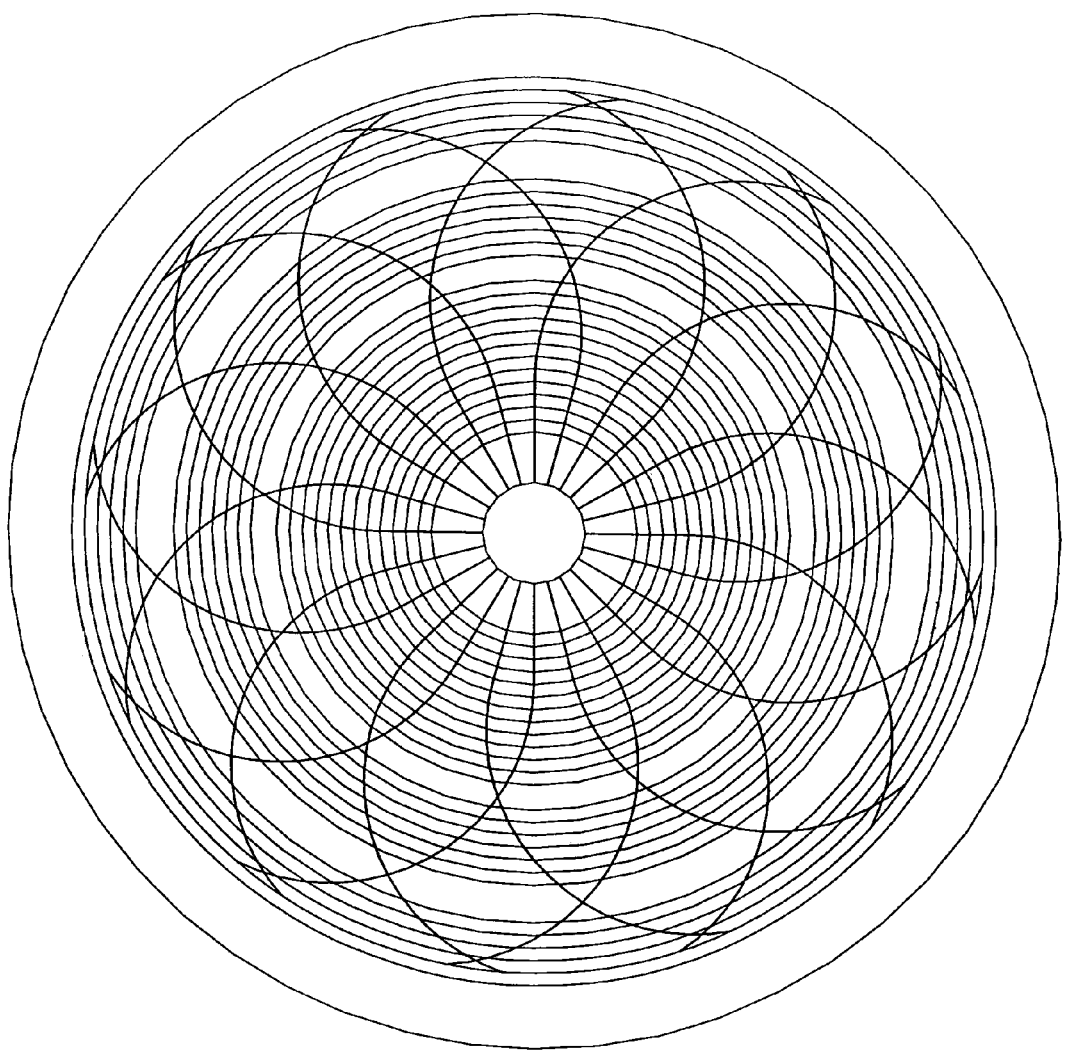

FIGS. 3A-3I provide illustrations of suitable groove designs as described herein. For example, shown in FIG. 3A is a CMP pad having reverse logarithmic grooves. FIG. 3B provides another depiction of a novel groove design where the grooves are overlapping circular grooves. While the grooves depicted in FIG. 3B are off-center, they need not be. FIG. 3C provides an illustration of a novel groove design where the design comprises double spiral grooves. FIG. 3D depicts a lassajous groove design, and FIGS. 3E to FIG. 3G depict variations having concentric circular grooves and axially grooves. As shown there, in some variations, the concentric circular grooves are spaced apart in sets, as in FIG. 3G. Similarly, in some variations, the axially curved grooves are overlapping as depicted in FIGS. 3F and 3G.

Figure 3H:
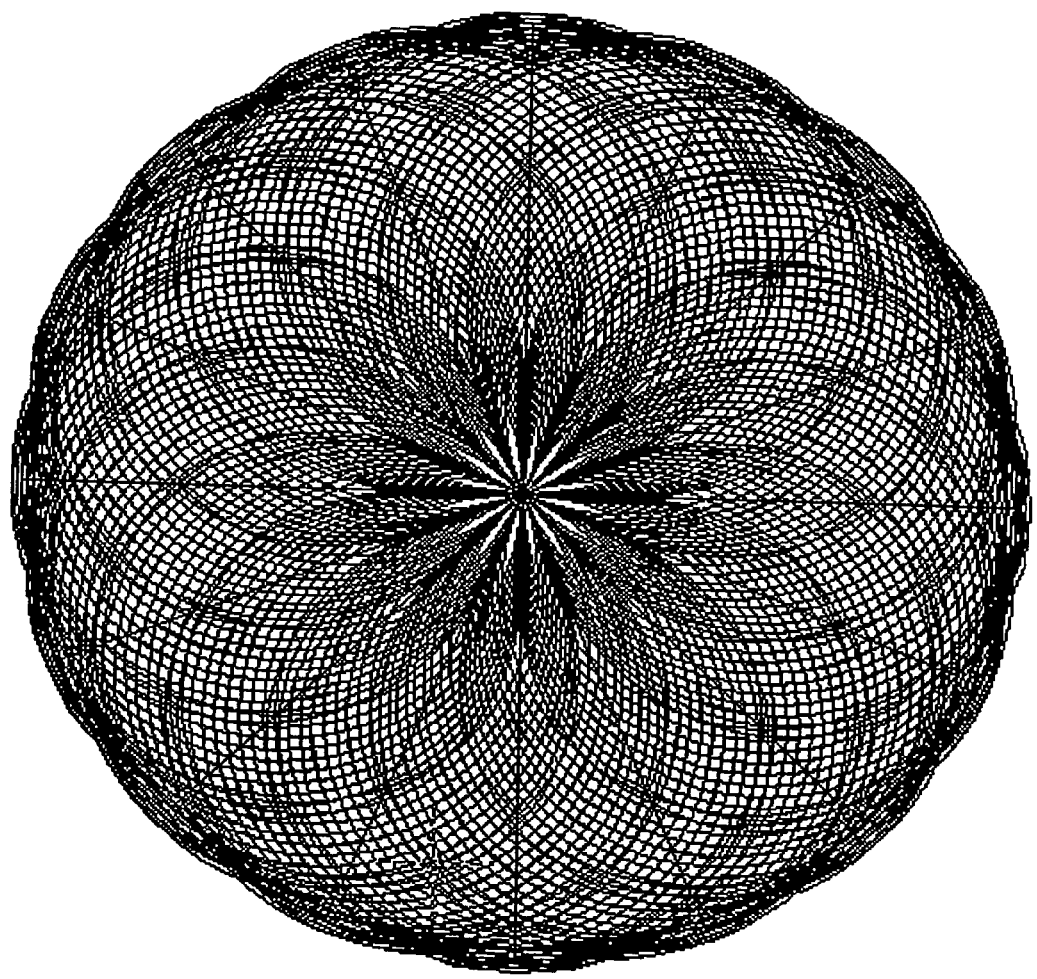
Figure 3I:
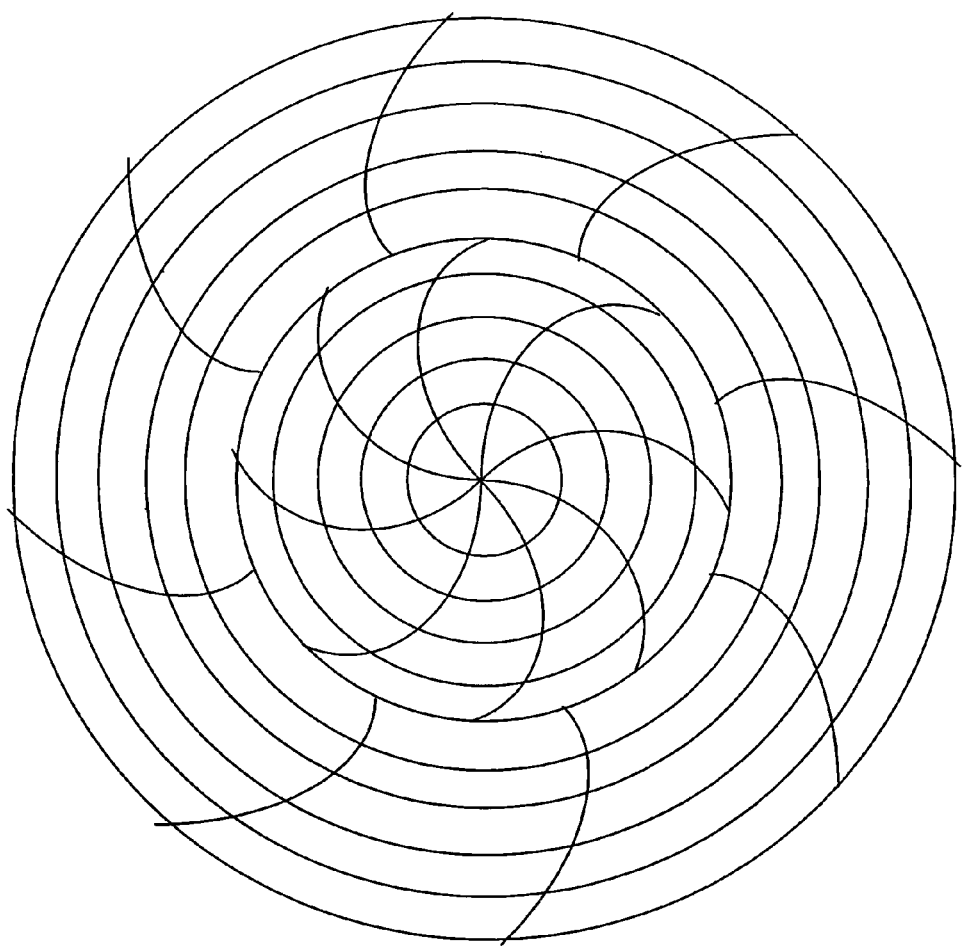

FIG. 3H shows a design having multiply overlapping axially curved grooves. This design may be particularly useful for soft polishing. FIG. 3I shows yet another design comprising concentric circular grooves and axially curved grooves, wherein the axially curved grooves are discontinuous. This variation may be particularly useful for reducing slurry loss.

These novel groove designs may be produced by any suitable method. For example, they may be produced using the in-situ methods described above, or they may be produced using ex-situ or mechanical methods, such as laser writing or cutting, water jet cutting, 3-D printing, thermoforming and vacuum forming, micro-contact forming, hot stamping or printing, and the like. The pads may also be sized or scaled as practicable to any suitable or desirable dimension. As described above, typically the scaling of the pads is based upon the size of the wafer to be polished. Illustrative dimensions were described above.

A. Laser Writing (Laser Cutting)

Laser writing or cutting may be used to make the novel groove designs described herein. Laser cutters typically consist of a downward-facing laser, which is mounted on a mechanically controlled positioning mechanism. A sheet of material, e.g., plastic, is placed under the working area of the laser mechanism. As the laser sweeps back and forth over the pad surface, the laser vaporizes the material forming a small channel or cavity at the spot in which the laser hits the surface. The resulting grooves/cuts are typically accurate and precise, and require no surface finishing. Typically, grooving of any pattern may be programmed into the laser cutting machine. More information on laser writing may be found in J. Kim et al, *J. Laser Applications*, vol. 15(4), pp 255-260, November 2003, which pages are hereby incorporated by reference in their entirety.

B. Water Jet Cutting

Water jet cutting may also be used to produce the novel groove designs described herein. This process uses a jet of pressurized water (e.g., as high as 60,000 pounds per square inch) to make grooves in the pad. Often, the water is mixed with an abrasive like garnet, which facilitates better tolerances, and good edge finishing. In order to achieve grooving of a desired pattern, the waterjet is typically pre-programmed (e.g., using a computer) to follow desired geometrical path. Additional description of water jet cutting may be found in J. P. Duarte et al, Abrasive water jet, *Rivista De Metalurgica*, vol. 34(2), pp 217-219, March-April 1998, which pages are hereby incorporated by reference in their entirety.

C. 3-D Printing

Three Dimensional printing (or 3-D printing) is another process that may be used to produce the novel groove designs described here. In 3-D printing, parts are built in layers. A computer (CAD) model of the required part is first made and then a slicing algorithm maps the information for every layer. Every layer starts off with a thin distribution of powder spread over the surface of a powder bed. A chosen binder material then selectively joins particles where the object is to be formed. Then a piston which supports the powder bed and the part-in-progress is lowered in order for the next powder layer to be formed. After each layer, the same process is repeated followed by a final heat treatment to make the part. Since 3-D printing can exercise local control over the material composition, microstructure, and surface texture, many new (and previously inaccessible) groove geometries may be achieved with this method. More information on 3-D printing may be found in Anon et al, 3-D printing speeds prototype dev., *Molding Systems*, vol. 56(5), pp 40-41, 1998, which pages are hereby incorporated by reference in their entirety.

D. Thermoforming and Vacuum Forming

Other processes that may be used to produce the novel groove designs described here are thermoforming and vacuum forming. Typically, these processes only work for thermoplastic materials. In thermoforming, a flat sheet of plastic is brought in contact with a mold after heating using vacuum pressure or mechanical pressure. Thermoforming techniques typically produce pads having good tolerances, tight specifications, and sharp details in groove design. Indeed, thermoformed pads are usually comparable to, and sometimes even better in quality than, injection molded pieces, while costing much less. More information on thermoforming may be found in M. Heckele et al., Rev. on micro molding of thermoplastic polymers, *J. micromechanics and microengineering*, vol. 14(3), pp R1-R14, March 2004, which pages are hereby incorporated by reference in their entirety.

Vacuum forming molds sheet plastic into a desired shape through vacuum suction of the warmed plastic onto a mold. Vacuum forming may be used to mold a specific thicknesses of plastic, for example 5 mm. Fairly complex moldings, and hence complex groove patterns, may be achieved with vacuum molding with relative ease.

E. Micro-contact Printing

Using micro contact printing (μCP), which is a high-resolution printing technique grooves can be embossed/printed on top of a CMP pad. This is sometimes characterized as "Soft Lithography." This method uses an elastomeric stamp to transfer a pattern onto the CMP pad. This method is a convenient, low-cost, non-photolithographic method for the formation and manufacturing of microstructures that can be used as grooves. These methods may be used to generate patterns and structures having feature sizes in the nanometer and micrometer (e.g., 0.1 to 1 micron) range.

F. Hot Stamping, Printing

Hot stamping can be used to generate the novel grooves designs describe here as well. In this process, a thermoplastic polymer may be hot embossed using a hard master (e.g., a piece of metal or other material that has a pattern embossed in it, can withstand elevated temperatures, and has sufficient rigidity to allow the polymer pad to become embossed when pressed into the hard master.) When the polymer is heated to a viscous state, it may be shaped under pressure. After conforming to the shape of the stamp, it may be hardened by cooling below the glass transition temperature. Grooving patterns of different types may be achieved by varying the initial pattern on the master stamp. In addition, this method allows for the generation of nanostructures, which may be replicated on large surfaces using molding of thermoplastic materials (e.g., by making a stamp with a nano-relief structure). Such a nano-structure may be used to provide local grading/grooving on these materials that may be useful for several CMP processes. W. Spalte, Hot-stamping for surface-treatment of plastics, *Kunsstoffe-German Plastics*, vol. 76(12), pp 1196-1199, December 1986, which pages are hereby incorporated by reference in their entirety, provides more information on hot stamping.

We claim:

1. A CMP pad comprising:
   concentric circular grooves in a first region of the pad and in a second region of the pad adjacent to the first region and radiating grooves which radiate linearly in the first region of the pad and are curved in the second region of the pad, wherein the radiating grooves cross the concentric circular grooves and wherein the first region is closer than the second region, to a central axis of the pad.

2. The CMP pad of claim 1 wherein the CMP pad is made from polyurethane.

3. The CMP pad of claim 1 wherein the grooves are produced by a method from the group consisting of silicone lining, laser writing, water jet cuffing, 3-D printing, thermoforming, vacuum forming, micro-contact printing, hot stamping, and mixtures thereof.

4. The CMP pad of claim 1 wherein the radiating grooves are continuous.

5. The CMP pad of claim 4 wherein the CMP pad is made from polyurethane.

6. The CMP pad of claim 5 wherein the circular grooves occupy a majority of a surface of the pad.

7. The CMP pad of claim 6 wherein the radiating grooves traverse a majority of the surface.

* * * * *